US012703177B2

(12) United States Patent
Fukugami

(10) Patent No.: US 12,703,177 B2
(45) Date of Patent: Aug. 11, 2026

(54) BARRIER FILM AND LAMINATE

(71) Applicant: TOPPAN Holdings Inc., Tokyo (JP)

(72) Inventor: Miki Fukugami, Tokyo (JP)

(73) Assignee: TOPPAN Holdings Inc., Tokyo (JP)

( * ) Notice: Subject to any disclaimer, the term of this patent is extended or adjusted under 35 U.S.C. 154(b) by 221 days.

(21) Appl. No.: 18/278,124

(22) PCT Filed: Feb. 21, 2022

(86) PCT No.: PCT/JP2022/006986

§ 371 (c)(1),
(2) Date: Aug. 21, 2023

(87) PCT Pub. No.: WO2022/181549

PCT Pub. Date: Sep. 1, 2022

(65) Prior Publication Data

US 2024/0123715 A1 Apr. 18, 2024

(30) Foreign Application Priority Data

Feb. 25, 2021 (JP) ................................ 2021-028367

(51) Int. Cl.
*B32B 27/08* (2006.01)
*B32B 27/32* (2006.01)
*B65D 65/40* (2006.01)

(52) U.S. Cl.
CPC .............. *B32B 27/08* (2013.01); *B32B 27/32* (2013.01); *B65D 65/40* (2013.01); *B32B 2255/10* (2013.01); *B32B 2255/20* (2013.01); *B32B 2255/26* (2013.01); *B32B 2255/28* (2013.01); *B32B 2307/514* (2013.01); *B32B 2307/7244* (2013.01); *B32B 2307/748* (2013.01); *B32B 2553/00* (2013.01)

(58) Field of Classification Search
None
See application file for complete search history.

(56) References Cited

U.S. PATENT DOCUMENTS 5,286,424 A 2/1994 Su et al.
2018/0009206 A1* 1/2018 Murase .................... B32B 9/00
(Continued)

FOREIGN PATENT DOCUMENTS

EP 1 081 170 A2 3/2001
EP 3 275 651 A1 1/2018
EP 3 892 463 A1 10/2021
(Continued)

OTHER PUBLICATIONS 2017-222151 (Year: 2025).*
The extended European search report issued by the European Patent Office on Jun. 4, 2024, which corresponds to European Patent Application No. 22759585.7 and is related to U.S. Appl. No. 18/278,124.
(Continued)

*Primary Examiner* — Samir Shah
(74) *Attorney, Agent, or Firm* — Studebaker Brackett PLLC

(57) ABSTRACT

A barrier film including a substrate film containing a polyolefin, in which when both surfaces of the barrier film are analyzed with a fluorescent X-ray analyzer, a value obtained by dividing a sum of fluorescent X-ray intensities of chlorine detected from the both surfaces by a thickness of the substrate film (the sum of fluorescent X-ray intensities of chlorine/the thickness of the substrate film) is 0.015 kcps/μm or less.

15 Claims, 2 Drawing Sheets

(56) References Cited

U.S. PATENT DOCUMENTS

| | | | |
|---|---|---|---|
| 2021/0291501 | A1 | 9/2021 | Kaminaga et al. |
| 2022/0153006 | A1 | 5/2022 | Tanaka et al. |

FOREIGN PATENT DOCUMENTS

| | | | |
|---|---|---|---|
| EP | 4 005 791 | A1 | 6/2022 |
| JP | 2000-254994 | | 9/2000 |
| JP | 2014-156017 | | 8/2014 |
| JP | 2017-222151 | | 12/2017 |
| JP | 2021-020391 | A | 2/2021 |
| JP | 6962437 | | 11/2021 |
| WO | WO 2016/158794 | A1 | 10/2016 |
| WO | 2020/116544 | A1 | 6/2020 |
| WO | 2021/029156 | A1 | 2/2021 |
| WO | 2021/220935 | A1 | 11/2021 |
| WO | WO 2022/044502 | | 3/2022 |

OTHER PUBLICATIONS

English Translation of IPRP (PCT/IB/338 and PCT/IB/373) (Sep. 7, 2023 and Aug. 29, 2023) and the Written Opinion of ISA (PCT/ISA/237) issued in counterpart International Application No. PCT/JP2022/006986 dated Apr. 26, 2022 (7 pages).

International Search Report issued in International Application No. PCT/JP2022/006986 dated Apr. 26, 2022.

Mio Gonokami et al., "Dissolution Behavior of the Antioxidant in PP in Tap Water and Evaluation of the Polymer Degradation", Nippon Gomu Kyokaishi, vol. 84, 2011.

Mitsui Chemicals, "Takelac A Takenate A", May 20, 2026.

Communication of a notice of apposition issued by the European Patent Office on Jul. 1, 2026, which corresponds to EP 22759585.7 and is related to U.S. Appl. No. 18/278,124.

* cited by examiner

BARRIER FILM AND LAMINATE

CROSS REFERENCE TO RELATED APPLICATIONS

This application is a 35 USC 371 U.S. national stage application of International Application No. PCT/JP2022/006986, filed on Feb. 21, 2022, which claims the priority benefit to Japanese Application No. 2021-028367, filed on Feb. 25, 2021. The International Application and the Japanese Application are incorporated by reference herein in their entirety.

TECHNICAL FIELD

The present disclosure relates to a barrier film and a laminate, and particularly to a barrier film and a laminate that are suitable for recycling.

BACKGROUND ART

In recent years, the whole world has come to share the recognition that environmental problems, such as marine pollution caused by plastic waste, and waste problems become serious and are becoming a global threat. In Japan, "Circulation strategy of plastic resources" for comprehensively promoting the circulation of plastic resources was formulated by Ministry of the Environment Government of Japan in May 2019, and it has been stipulated that used plastics should be effectively utilized by 100% reusing, recycling, or the like by the year 2035.

In order to cope with such social situations, the demand for a packaging material suitable for material recycling is increasing. In recycling, a step of cutting the recovered packaging material, sorting and washing the cut packaging materials as necessary, and then melt-mixing the materials using an extruder is generally adopted.

In the material recycling, a packaging material obtained by laminating a plurality of resins such as nylon, polyethylene terephthalate, and polyolefin has a problem in that the resin of each layer is difficult to be separated and recovered. Therefore, recently, the movement to produce a packaging material by a mono-material (single material) is accelerating.

On the other hand, in the field of packaging materials, a gas barrier function is often required in order to suppress the quality deterioration of packaged contents. In such a case, an aluminum foil or a transparent gas barrier film is used, but the aluminum foil may be problematic from the standpoint of the environment and packaged content visibility, so that the transparent gas barrier film is generally used. From the viewpoint of mono-material packaging material formation, there is an increasing demand for a barrier film using a polypropylene film as a substrate, and proposals to meet this demand have also been made as described in Patent Literature 1 and Patent Literature 2.

CITATION LIST

Patent Literature

Patent Literature 1: Japanese Unexamined Patent Publication No. 2000-254994

Patent Literature 2: International Publication WO 2016/158794

SUMMARY OF INVENTION

Technical Problem

However, when the barrier film is material-recycled, there is a problem in that the resin deteriorates and colored, which is not suitable for recycling in some cases. Deterioration of the resin is likely to occur in the step of melt-mixing the packaging material.

Therefore, an object of the present disclosure is to provide a barrier film and a laminate that can suppress coloring during recycling and are excellent in recyclability.

Solution to Problem

In order to achieve the above object, the present disclosure provides a barrier film including a substrate film containing a polyolefin, in which when both surfaces of the barrier film are analyzed with a fluorescent X-ray analyzer, a value obtained by dividing a sum of fluorescent X-ray intensities of chlorine detected from the both surfaces by a thickness of the substrate film (the sum of fluorescent X-ray intensities of chlorine/the thickness of the substrate film) is 0.015 kcps/μm or less.

An olefin-based resin such as a polypropylene or a polyethylene used in the substrate film of the barrier film is likely to be oxidized by heat, and an oxidative decomposition reaction is likely to occur when the olefin-based resin is melted at high temperatures. With the oxidative decomposition reaction, the mechanical properties and physical properties of the resin are deteriorated, and when the reaction progresses further, the resin is carbonized and the appearance is discolored into brown or black. It is difficult to use the resin having undergone the oxidative decomposition reaction in this way as a recycled product. As a result of intensive studies of the present inventor, the present inventor has found that chlorine present in the barrier film serves as a catalyst for the oxidative decomposition reaction of the olefin-based resin and has the function of promoting the oxidative decomposition reaction, and the presence amount of chlorine required for promoting oxidative decomposition is changed by the thickness of the film. Then, the present inventor has found that when both surfaces of the barrier film are analyzed with a fluorescent X-ray analyzer, by setting a value obtained by dividing a sum of fluorescent X-ray intensities of chlorine detected from the both surfaces by a thickness of the substrate film (the sum of fluorescent X-ray intensities of chlorine/the thickness of the substrate film) to 0.015 kcps/μm or less, the oxidative decomposition of the polyolefin in the barrier film during recycling can be suppressed, so that coloring can be suppressed. Therefore, the barrier film satisfying the above conditions can suppress coloring during recycling and have excellent recyclability.

The barrier film may further include a gas barrier layer formed on at least one surface of the substrate film. By the barrier film including the gas barrier layer, the gas barrier properties of the barrier film are improved. Furthermore, chlorine present in the barrier film is derived from the substrate film itself as well as from the gas barrier layer. However, by setting the above value of (the sum of fluorescent X-ray intensities of chlorine/the thickness of the substrate film) to 0.015 kcps/μm or less, even when chlorine derived from the gas barrier layer exists, coloring during recycling can be suppressed. Therefore, a barrier film excellent in recyclability and gas barrier properties can be provided.

The gas barrier layer may include a vapor deposition layer containing an inorganic oxide. The inorganic oxide may include aluminum oxide, silicon oxide, or a mixture thereof. By the gas barrier layer including the vapor deposition layer, the gas barrier properties of the barrier film can be further improved.

The gas barrier layer may include a gas barrier coating layer. By the gas barrier layer including the gas barrier coating layer, the gas barrier properties of the barrier film can be further improved. Furthermore, by forming the gas barrier coating layer on the vapor deposition layer, the vapor deposition layer can be protected.

The gas barrier coating layer may be a layer formed by using a composition for forming a gas barrier coating layer, the composition containing at least one of a silicon compound represented by General Formula (1) below or a hydrolysate thereof, at least one of a silicon compound represented by General Formula (2) below and a hydrolysate thereof, and a water-soluble polymer having a hydroxyl group.

$$Si(OR^1)_4 \quad (1)$$

$$(R^2Si(OR^3)_3)_n \quad (2)$$

[in General Formulas (1) and (2), $R^1$ and $R^3$ each independently represent $CH_3$, $C_2H_5$ or $C_2H_4OCH_3$, $R^2$ represents an organic functional group, and n represents an integer of 1 or more.]

Furthermore, the gas barrier coating layer may be a layer formed by using a composition for forming a gas barrier coating layer, the composition containing a polyurethane resin, a water-soluble polymer having a hydroxyl group, and a curing agent. Here, the polyurethane resin may include a reaction product of an acid group-containing polyurethane resin containing an acid group and a polyamine compound having an amino group.

In a case where the gas barrier coating layer is a layer formed using any of the above compositions for forming a gas barrier coating layer, the above value of (the sum of fluorescent X-ray intensities of chlorine/the thickness of the substrate film) can be reduced, so that recyclability can be further enhanced and further excellent gas barrier properties can be obtained.

In the barrier film, the polyolefin may be a polypropylene. In this case, the heat resistance of the barrier film can be improved.

The present disclosure also provides a laminate including two or more resin films containing a polyolefin, in which when each resin film is peeled off from the laminate and both surfaces of all the resin films are analyzed with a fluorescent X-ray analyzer, a value obtained by dividing a sum of fluorescent X-ray intensities of chlorine detected from all the surfaces of all the resin films by a thickness of the laminate (the sum of fluorescent X-ray intensities of chlorine/the thickness of the laminate) is 0.015 kcps/μm or less.

In the laminate including two or more resin films containing a polyolefin, by setting the value obtained by the sum of fluorescent X-ray intensities of chlorine detected from all the surfaces of each resin film by the thickness of the laminate (the sum of fluorescent X-ray intensities of chlorine/the thickness of the laminate) to 0.015 kcps/μm or less, the oxidative decomposition of the polyolefin in the barrier film during recycling can be suppressed and coloring can be suppressed. Therefore, the laminate satisfying the above conditions can suppress coloring during recycling and have excellent recyclability.

Advantageous Effects of Invention

According to the present disclosure, it is possible to provide a barrier film and a laminate that can suppress coloring during recycling and are excellent in recyclability.

DESCRIPTION OF EMBODIMENTS

Hereinafter, embodiments of the present disclosure will be specifically described.

A barrier film of the present embodiment includes a substrate film containing a polyolefin. Furthermore, when both surfaces of the barrier film are analyzed with a fluorescent X-ray analyzer, a value obtained by dividing a sum of fluorescent X-ray intensities of chlorine detected from the both surfaces by a thickness of the substrate film (the sum of fluorescent X-ray intensities of chlorine/the thickness of the substrate film) is 0.015 kcps/μm or less.

A laminate of the present embodiment includes two or more resin films containing a polyolefin. Furthermore, when each resin film is peeled off from the laminate and both surfaces of all the resin films are analyzed with a fluorescent X-ray analyzer, a value obtained by dividing a sum of fluorescent X-ray intensities of chlorine detected from all the surfaces of all the resin films by a thickness of the laminate (the sum of fluorescent X-ray intensities of chlorine/the thickness of the laminate) is 0.015 kcps/μm or less.

In the present specification, the value of (the sum of fluorescent X-ray intensities of chlorine/the thickness of the substrate film) and the value (the sum of fluorescent X-ray intensities of chlorine/the thickness of the laminate) are called "chlorine amount" (unit: kcps/μm).

<Barrier Film>

The barrier film of the present embodiment includes at least the substrate film containing a polyolefin, and may have layers other than the substrate film. The barrier film may further include a gas barrier layer formed on at least one surface of the substrate film. This gas barrier layer may have one or both of a vapor deposition layer containing an inorganic oxide and a gas barrier coating layer. Further, the barrier film may include an anchor coat layer between the substrate film and the gas barrier layer.

Figure 1:
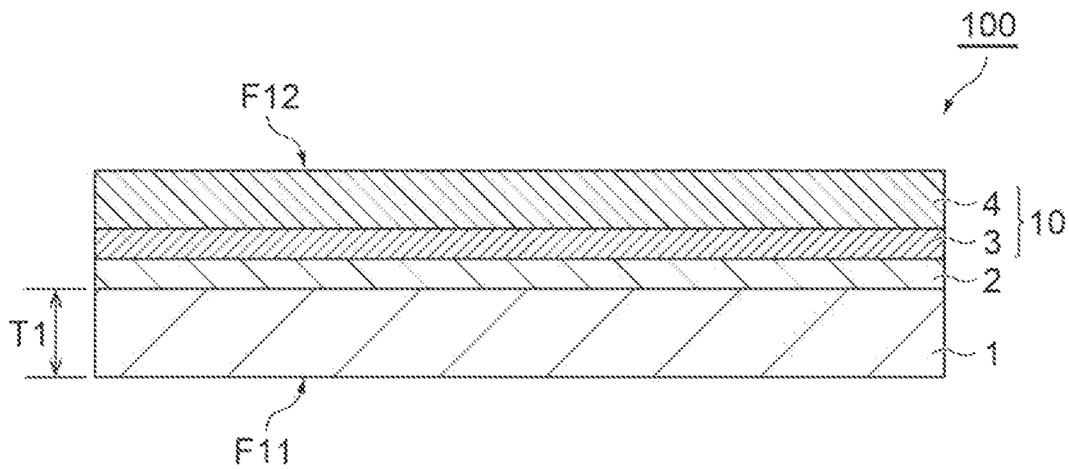
FIG. 1 is a schematic cross-sectional view illustrating an embodiment of a barrier film of the present disclosure.

FIG. 1 is a schematic cross-sectional view illustrating a barrier film according to an embodiment. A barrier film 100 illustrated in FIG. 1 includes a substrate film 1, an anchor coat layer 2, and a gas barrier layer 10 in this order. The gas barrier layer 10 includes a vapor deposition layer 3 and a gas barrier coating layer 4. Hereinafter, each layer constituting the barrier film will be described.

[Substrate Film 1]

The substrate film 1 is a layer serving as a support and contains a polyolefin. The substrate film 1 may be a polyolefin film containing a polyolefin as a main component. Here, the term "main component" refers to a component whose content percentage in the film is 50% by mass or more. The content of polyolefin in the substrate film 1 may be 50% by mass or more, may be 80% by mass or more, and may be 100% by mass, on the basis of the total amount of the substrate film 1. As the content of polyolefin in the substrate film 1 becomes higher, recyclability is improved.

Examples of the polyolefin include a polyethylene and a polypropylene, and from the viewpoint of heat resistance, polypropylene is preferable. As the polypropylene, from the viewpoint of heat resistance, homopolypropylene, which is a homopolymer of propylene, is preferably used. However, as long as the heat resistance is not impaired, a copolymer containing an α-olefin or a blend of homopolypropylene and other polypropylene may be used. Furthermore, for the purpose of improving adhesion, the copolymer or blend described above may be disposed on the surface layer of the polypropylene film.

The substrate film 1 may be stretched and may be unstretched. The polypropylene film used as the substrate film 1 may be a uniaxially or biaxially oriented film obtained by forming the polypropylene resin into a sheet and stretching the sheet by a conventional means, and may be an unstretched film.

Known additives, for example, organic additives such as antioxidants, stabilizers, lubricants such as calcium stearate, fatty acid amides, and erucic acid amides, and antistatic agents, particulate lubricants such as silica, zeolite, thyroid, hydrotalcite, and silicon particles, and the like may be added to the substrate film 1 depending on the purpose.

As polyolefin resins, such as homopolypropylene and a propylene copolymer, used in the substrate film 1, recycled resins may be used, and resins obtained by polymerizing biomass-derived raw materials such as plants may be used. In the case of using these resins, these resins may be used singly or in combination with resins polymerized from ordinary fossil fuels.

The thickness (a thickness T1 in FIG. 1) of the substrate film 1 is not particularly limited. The thickness can be set to 6 to 200 μm depending on use application, but from the viewpoint of obtaining excellent recyclability and excellent impact resistance, the thickness may be 9 to 50 μm and may be 12 to 38 μm.

[Anchor Coat Layer 2]

The anchor coat layer (undercoat layer) 2 may be provided on the surface of the substrate film 1 on which the vapor deposition layer 3 is laminated. The anchor coat layer 2 can exhibit effects of improving the adhesion between the substrate film 1 and the vapor deposition layer 3, improving the smoothness of the surface of the substrate film 1, and suppressing occurrence of cracking of the vapor deposition layer 3 caused by the elongation of the substrate film 1. Note that, when smoothness is improved, the vapor deposition layer 3 is easily formed into a uniform film without defects, and high barrier properties are easily exhibited. The anchor coat layer 2 can be formed by using a composition (anchor coating agent) for forming an anchor coat layer.

Examples of the resin used in the anchor coating agent include an acrylic resin, an epoxy resin, an acrylic urethane-based resin, a polyester-based polyurethane resin, and a polyether-based polyurethane resin. The anchor coat layer 2 can be formed by using an anchor coating agent containing these resins or a component forming these resins through reaction.

The thickness of the anchor coat layer 2 is not particularly limited, and is preferably in a range of 0.01 to 5 m, more preferably in a range of 0.03 to 3 μm, and particularly preferably in a range of 0.05 to 2 μm. When the thickness of the anchor coat layer 2 is the lower limit value or more, a more sufficient interlayer adhesion strength tends to be obtainable; on the other hand, when the thickness thereof is the upper limit value or less, desired gas barrier properties tends to be easily exhibited.

[Vapor Deposition Layer 3]

The vapor deposition layer 3 containing an inorganic oxide can be laminated on at least one surface of the substrate film 1 in order to impart barrier properties. The vapor deposition layer 3 containing an inorganic oxide may be composed of a vapor deposition film of an inorganic oxide such as aluminum oxide, silicon oxide, tin oxide, magnesium oxide, or a mixture thereof, and may be a layer having transparency and gas barrier properties against oxygen, water vapor, or the like. In consideration of resistance to various bactericides, among these, particularly, aluminum oxide and silicon oxide are more preferably used. However, the material used for the vapor deposition layer 3 of the present embodiment is not limited to the aforementioned inorganic oxide, and any material meeting the above conditions can be used.

The optimum thickness of the vapor deposition layer 3 varies depending on the type and configuration of inorganic oxide used, but in general, the thickness is desirably within a range of 5 to 300 nm, and the value thereof is appropriately selected. The thickness of the vapor deposition layer 3 may be 5 to 100 nm. When the film thickness is 5 nm or more, a uniform film can be easily obtained, and since the film thickness is sufficient, there is a tendency that the gas barrier layer can function satisfactorily. On the other hand, when the film thickness is 300 nm or less, there are tendencies that a thin film easily retains flexibility and cracks can be prevented from being generated in the thin film due to external factors such as bending and tension after film formation. Since these effects can be obtained more easily, the thickness of the vapor deposition layer 3 is more preferably within a range of 10 to 150 nm.

There are various methods of forming the vapor deposition layer 3 on the substrate film 1, and the vapor deposition layer 3 can be formed by a common vacuum deposition method. Furthermore, other thin film formation methods, such as a sputtering method, an ionic plating method, a plasma vapor deposition method (CVD), can also be used. However, in consideration of productivity, a vacuum deposition method is more excellent at the moment. As a heating means of the vacuum deposition method, any one of an electron beam heating method, a resistive heating method, and an induction heating method is preferably used, but in consideration of broadness of selectivity of evaporation materials, an electron beam heating method is more preferably used. Furthermore, in order to improve the adhesion between the vapor deposition layer 3 and the substrate film 1 and denseness of the vapor deposition layer 3, vapor deposition can also be performed using a plasma assisted method or an ion beam assisted method. Furthermore, in order to increase the transparency of the vapor deposition film, reactive vapor deposition with blow of various gases such as oxygen may be used during vapor deposition.

In order to strengthen the adhesion between the substrate film 1 and the vapor deposition layer 3, the surface of the substrate film 1 may be subjected to a surface treatment such as a plasma treatment or a corona treatment, and the aforementioned anchor coat layer 2 may be provided between the substrate film 1 and the vapor deposition layer 3. By performing these surface treatments or providing the anchor coat layer 2, performances such as adhesion and barrier properties after heat sterilization are improved.

[Gas Barrier Coating Layer 4]

The gas barrier coating layer 4 can also be provided on the vapor deposition layer 3 for the purpose of protecting the vapor deposition layer 3 and supplementing the barrier properties. The gas barrier coating layer 4 is not particularly limited as long as it can achieve the above object and is a material having recycling suitability. As the composition for forming a gas barrier coating layer used for forming the gas barrier coating layer 4, for example, a solution obtained by mixing one or more silicon compounds or a hydrolysate thereof and a water-soluble polymer, a solution obtained by mixing one or more silicon compounds or a hydrolysate thereof, a water-soluble polymer, an inorganic layered compound, and a silane coupling agent, a solution obtained by mixing an aqueous polyurethane resin and a water-soluble polymer, or the like can be used. The gas barrier coating layer 4 can be formed by coating these compositions for forming a gas barrier coating layer on the vapor deposition layer 3, followed by heating and drying. An isocyanate compound, or known additives such as a silane coupling agent, a dispersant, a stabilizer, a viscosity modifier, and a colorant can also be added into the composition for forming a gas barrier coating layer as necessary as long as the gas barrier properties are not impaired.

Examples of the composition for forming a gas barrier coating layer include a composition containing at least one of a silicon compound represented by General Formula (1) below or a hydrolysate thereof, at least one of a silicon compound represented by General Formula (2) below and a hydrolysate thereof, and a water-soluble polymer having a hydroxyl group. By using the composition for forming a gas barrier coating layer, the chlorine amounts of the barrier film and the laminate can be reduced, recyclability can be enhanced, and excellent gas barrier properties can be attained.

$$Si(OR^1)_4 \quad (1)$$

$$(R^2Si(OR^3)_3)_n \quad (2)$$

[in General Formulas (1) and (2), $R^1$ and $R^3$ each independently represent $CH_3$, $C_2H_5$ or $C_2H_4OCH_3$, $R^2$ represents an organic functional group, and n represents an integer of 1 or more.]

As the compound represented by the above General Formula (1), any compounds can be used as long as they are compounds in which $R^1$ is represented by $CH_3$, $C_2H_5$ or $C_2H_4OCH_3$, and among these, tetraethoxysilane is preferable.

Examples of the water-soluble polymer having a hydroxyl group include polyvinyl alcohol and a modified product thereof, polyacrylic acid, starch, and celluloses. Of them, from the viewpoint of obtaining further excellent gas barrier properties, polyvinyl alcohol and a modified product thereof are preferable. By using the water-soluble polymer, flexibility can be imparted to the gas barrier coating layer, and occurrence of cracks can be suppressed.

By the composition for forming a gas barrier coating layer containing the compound represented by the above General Formula (2) or a hydrolysate thereof, the water resistance of the gas barrier coating layer can be enhanced. In the compound represented by the above General Formula (2), the organic functional group represented by $R^2$ preferably includes a hydrophobic functional group such as a vinyl group, an epoxy group, a methacryloxy group, a ureido group, and an isocyanate group. By $R^2$ including a hydrophobic functional group, the water resistance of the gas barrier coating layer can be further enhanced. Furthermore, n in General Formula (2) may be an integer of 1 or more.

In a case where the compound represented by General Formula (2) is a polymer, a trimer is preferable, and from the viewpoint of more enhancing water resistance, 1,3,5-tris(3-trialkoxysilylalkyl) isocyanurate represented by general formula $(NCO—R^4Si(OR_3)_3)_3$ (in the formula, $R^4$ represents $(CH_2)_m$, and m represents an integer of 1 or more) is more preferable. This is a condensate of 3-isocyanate alkyl alkoxysilane.

In the composition for forming a gas barrier coating layer, the blended amount of each of the components is not particularly limited, but in the case of converting $Si(OR^1)_4$ and $R^2Si(OR_3)_3$ into $SiO_2$ and $R^2Si(OH)_3$ respectively, the blending ratio of solid content may be a mass ratio, and $SiO_2/(R^2Si(OH)_3$/the water-soluble polymer) may be within a range of 100/100 to 100/30.

Furthermore, other examples of the composition for forming a gas barrier coating layer include a composition containing a polyurethane resin, a water-soluble polymer having a hydroxyl group, and a curing agent, in which the polyurethane resin includes a reaction product of an acid group-containing polyurethane resin containing an acid group and a polyamine compound having an amino group. By using the composition for forming a gas barrier coating layer, the chlorine amounts of the barrier film and the laminate can be reduced, recyclability can be enhanced, and excellent gas barrier properties can be attained.

The acid group-containing polyurethane resin may be one capable of bonding with the amino group of the polyamine compound constituting the polyurethane resin, and examples of the acid group include a carboxy group and a sulfonic acid group. As the acid group-containing polyurethane resin, for example, one having a constituent unit containing a cyclic hydrocarbon and a constituent unit containing a chain hydrocarbon is used. Specific examples of the acid group-containing polyurethane resin include a carboxylic acid-modified polyurethane resin and a sulfonic acid-modified polyurethane resin. These can be used singly or in combination with two or more kinds thereof.

The amino group of the polyamine compound may be any of a primary amino group, a secondary amino group, and a tertiary amino group. Specific examples of the polyamine compound include alkylenediamines and polyalkylenepolyamines. These can be used singly or in combination with two or more kinds thereof.

Examples of the water-soluble polymer having a hydroxyl group include polyvinyl alcohol and a modified product thereof, polyacrylic acid, starch, and celluloses. Of them, from the viewpoint of obtaining further excellent gas barrier properties, polyvinyl alcohol and a modified product thereof are preferable.

The curing agent is not limited as long as it is a curing agent capable of curing the composition for forming a gas barrier coating layer. The curing agent may be a silane coupling agent.

Examples of the silane coupling agent include a compound represented by General Formula (3) below.

$$Si(OR^{11})_p(R^{12})_{3-p}R^{13} \quad (3)$$

In the above General Formula (3), $R^{11}$ represents an alkyl group such as methyl group or an ethyl group, $R^{12}$ represents a monovalent organic group such as an alkyl group or an alkyl group substituted with an aralkyl group, an aryl group, an alkenyl group, an acryloxy group, or a methacryloxy group, $R^{13}$ represents a monovalent organic functional group, and p represents an integer of 1 to 3. Note that, in a case where a plurality of $R^{11}$'s or $R^{12}$'s exist, $R^{11}$'s or $R^{12}$'s may be the same as or different from each other. Examples of the monovalent organic functional group represented as $R^{13}$ include a monovalent organic functional group containing a vinyl group, an epoxy group, a mercapto group, an amino group, or an isocyanate group. Of them, as the monovalent organic functional group, one containing an epoxy group is preferable. In this case, the composition can have further excellent hot water resistance upon curing.

Examples of the silane coupling agent include a silane coupling agent having a vinyl group such as vinyltrimethoxysilane or vinyltriethoxysilane; a silane coupling agent having an epoxy group such as 3-glycidoxypropyltrimethoxysilane, 3-glycidoxypropyltriethoxysilane, 3-glycidoxypropylmethyldimethoxysilane, or 3-glycidoxypropylethyldiethoxysilane; a silane coupling agent having a mercapto group such as 3-mercaptopropyltrimethoxysilane or 3-mercaptopropylmethyldimethoxysilane; a silane coupling agent having am amino group such as 3-aminopropyltrimethoxysilane and 3-aminopropyltriethoxysilane; and a silane coupling agent having an isocyanate group such as 3-isocyanatopropyltriethoxysilane. These silane coupling agents may be used singly or in combination of two or more.

In the composition for forming a gas barrier coating layer, the blended amount of each of the components is not particularly limited, but it is preferable that the content percentage of the polyurethane resin is 45% by mass or more and 75% by mass or less, the content percentage of the water-soluble polymer is 20% by mass or more and 35% by mass or less, and the content percentage of the curing agent is 5% by mass or more and 20% by mass or less, on the basis of the total amount of solid contents of the composition for forming a gas barrier coating layer. By satisfying this content percentage, a gas barrier coating layer to be obtained can have excellent abuse resistance and excellent hot water resistance.

The composition for forming a gas barrier coating layer may or may not contain an inorganic layered mineral as an inorganic layered compound. The inorganic layered mineral refers to an inorganic compound in which unit crystal layers are stacked to form one layered particle.

Examples of the inorganic layered mineral include hydrous silicates such as phyllosilicate minerals. Specific examples of the hydrous silicates include kaolinite clay minerals such as halloysite, kaolinite, and endellite; antigorite clay minerals such as antigorite and chrysotile; smectite clay minerals such as montmorillonite and beidellite; vermiculite clay minerals such as vermiculite; micas such as synthetic mica, muscovite, and phlogopite. These can be used singly or in combination with two or more kinds thereof.

The content percentage of the inorganic layered mineral is preferably less than 2% by mass on the basis of the total amount of solid contents of the composition for forming a gas barrier coating layer. In this case, as compared with a case where the content percentage of the inorganic layered mineral is 2% by mass or more, the lamination strength of a gas barrier coating layer to be obtained can be improved. The content percentage of the inorganic layered mineral may be 0% by mass.

The thickness of the gas barrier coating layer 4 is preferably 0.05 to 2 μm, more preferably 0.1 to 1 μm, and further preferably 0.3 to 0.5 μm. When the thickness of the gas barrier coating layer 4 is 2 μm or less, there are tendencies that the chlorine amount in the barrier film and the laminate is easily reduced and coloring when the barrier film and the laminate are recycled is easily suppressed. When the thickness of the gas barrier coating layer 4 is 0.05 μm or more, the gas barrier properties of the barrier film and the laminate can be enhanced.

<Laminate>

The laminate of the present embodiment includes two or more resin films containing a polyolefin, and may have layers other than the resin films. The laminate may further include a gas barrier layer formed on at least one surface of one of the resin films. This gas barrier layer may have one or both of a vapor deposition layer containing an inorganic oxide and a gas barrier coating layer. Further, the laminate may include an anchor coat layer between the resin film and the gas barrier layer. The laminate may be obtained by further laminating a resin film on one surface of the barrier film of the present embodiment described above. In this case, the substrate film included in the barrier film is a first resin film, and the resin film further laminated on the barrier film is a second resin film. The second resin film may be laminated on the barrier film with an adhesive layer interposed therebetween. The second resin film may be a sealant layer.

Figure 2:
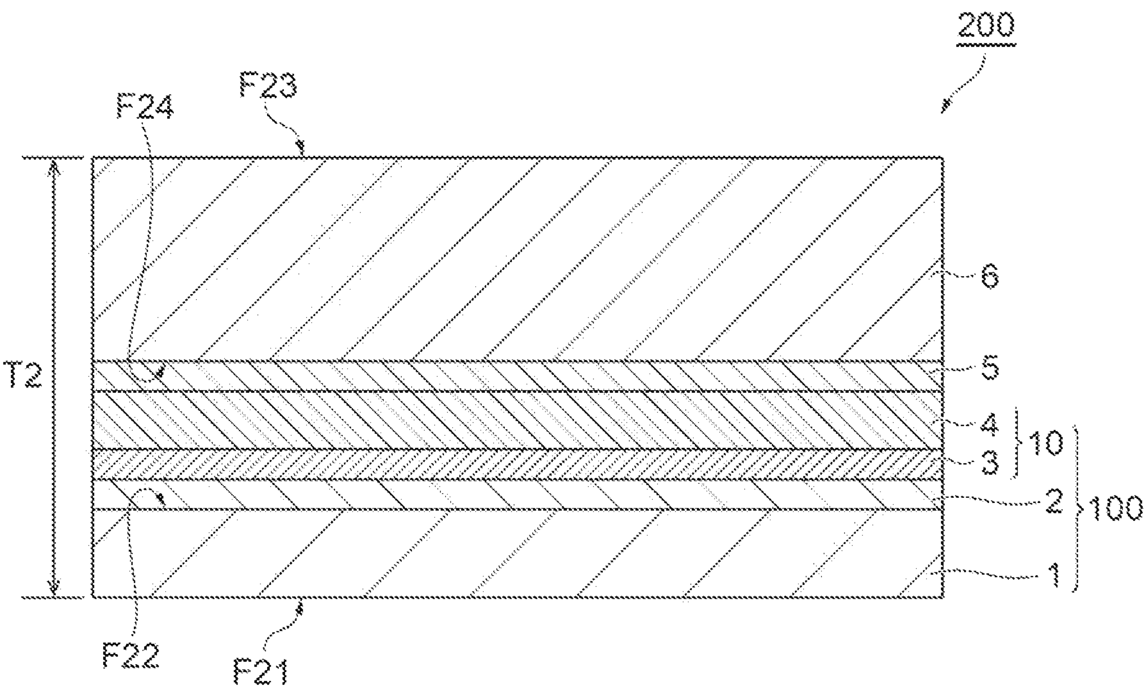
FIG. 2 is a schematic cross-sectional view illustrating an embodiment of a laminate of the present disclosure.

FIG. 2 is a schematic cross-sectional view illustrating a laminate according to an embodiment. A laminate 200 illustrated in FIG. 2 has a structure in which a sealant layer 6 as a resin film is laminated on the surface of the barrier film 100 on the gas barrier coating layer 4 side with an adhesive layer 5 interposed therebetween. The laminate 200 includes two layers of the substrate film 1 and the sealant layer 6 as a resin film containing a polyolefin.

[Adhesive Layer 5]

As a material for the adhesive layer 5, for example, a polyester-isocyanate-based resin, a urethane resin, a polyether-based resin, and the like can be used. From the viewpoint of enhancing hot water resistance, a two-liquid curable urethane-based adhesive can be preferably used.

[Sealant Layer 6]

The sealant layer 6 is a layer imparting sealing properties to the laminate 200 by heat sealing, and contains a polyolefin. The sealant layer 6 may be a polyolefin film containing a polyolefin as a main component. Here, the term "main component" refers to a component whose content percentage in the film is 50% by mass or more. The content of polyolefin in the sealant layer 6 may be 50% by mass or more, may be 80% by mass or more, and may be 100% by mass, on the basis of the total amount of the sealant layer 6. As the content of polyolefin in the sealant layer 6 becomes higher, recyclability is improved.

Examples of the polyolefin include a polyethylene and a polypropylene, and from the viewpoint of heat resistance, a polypropylene is preferable. As the polypropylene, from the viewpoint of heat-sealability, a copolymer or blend of a propylene and an α-olefin is preferably used. Of them, a propylene-ethylene random copolymer or a propylene-ethylene block copolymer is preferably used. Furthermore, the same type of polyolefin is preferably used for the sealant layer 6 and the substrate film 1, and for example, in the case of using homopolypropylene in the substrate film 1, homopolypropylene is also preferably used for the sealant layer 6.

The polyolefin film used for the sealant layer 6 may be stretched or unstretched, and from the viewpoint of reducing the heat-fusing temperature to be lower than that of the substrate film 1 to make heat-sealability favorable, the polyolefin film is preferably an unstretched film. In this case, the substrate film 1 is preferably a stretched film.

Known additives, for example, organic additives such as antioxidants, stabilizers, lubricants such as calcium stearate, fatty acid amides, and erucic acid amides, and antistatic agents, particulate lubricants such as silica, zeolite, thyroid, hydrotalcite, and silicon particles, and the like may be added to the sealant layer 6 depending on the purpose.

As polyolefin resins, such as homopolypropylene and a propylene copolymer, used in the sealant layer 6, recycled resins may be used, and resins obtained by polymerizing biomass-derived raw materials such as plants may be used. In the case of using these resins, these resins may be used singly or in combination with resins polymerized from ordinary fossil fuels.

The thickness of the sealant layer 6 is not particularly limited. The thickness can be set to 6 to 200 μm depending on use application, but from the viewpoint of obtaining excellent recyclability and excellent impact resistance, the thickness may be 10 to 150 μm and may be 20 to 100 μm.

The thickness (a thickness T2 in FIG. 2) of the entire laminate 200 is not particularly limited. The thickness can beset to 10 to 400 μm depending on use application, may be 20 to 200 μm, and may be 50 to 150 μm.

In the case of material recycling—the barrier film 100 or the laminate 200, there is a method in which the recovered barrier film 100 or laminate 200 is pulverized, the pulverized product is charged into an extruder and melted at a temperature equal to or higher than the melting point, and this molten product is pelletized and then reused. In addition, the molten product can also be molded as it is and used for other purposes.

An olefin-based resin such as a polypropylene or a polyethylene is likely to be oxidized by heat, and an oxidative decomposition reaction is likely to occur when the olefin-based resin is melted at high temperatures. With the oxidative decomposition reaction, the mechanical properties and physical properties of the resin are deteriorated, and when the reaction progresses further, the resin is carbonized and the appearance is discolored into brown or black. The resin having undergone the oxidative decomposition reaction in this way cannot be used as a recycled product.

In the barrier film 100 having recycling suitability according to the present embodiment, it is necessary that when both surfaces (F11 and F12 in FIG. 1) of the barrier film 100 are analyzed with a fluorescent X-ray analyzer, a value obtained by dividing a sum of fluorescent X-ray intensities of chlorine (Cl) detected from the both surfaces by the thickness (T1 in FIG. 1) of the substrate film 1 (the sum of fluorescent X-ray intensities of chlorine/the thickness of the substrate film 1) is 0.015 kcps/μm or less.

Furthermore, in the laminate 200 having recycling suitability according to the present embodiment, it is necessary that when the substrate film 1 and the sealant layer 6 as resin films are peeled off from the laminate 200 and both surfaces (F21 and F22, and F23 and F24 in FIG. 2) of the substrate film 1 and the sealant layer 6 are analyzed with a fluorescent X-ray analyzer, a value obtained by dividing a sum of fluorescent X-ray intensities of chlorine detected from all the surfaces of the substrate film 1 and the sealant layer 6 by the thickness (T2 in FIG. 2) of the laminate 200 (the sum of fluorescent X-ray intensities of chlorine/the thickness of the laminate 200) is 0.015 kcps/μm or less.

In the barrier film 100 and the laminate 200, when the chlorine amount determined by the above method is 0.015 kcps/μm or less, coloring during recycling (melting) described above can be suppressed, and the barrier film 100 has excellent recycling suitability. Furthermore, when the chlorine amount is 0.015 kcps/μm or less, deterioration of the mechanical properties and physical properties of the resin during recycling (melting) can also be suppressed.

For fluorescent X-ray analysis, for example, a wavelength dispersive fluorescent X-ray analyzer Supermini manufactured by Rigaku Corporation can be used as an apparatus. It is checked that the resolution of a PC detector is 45% or less by using a PHA-adjusted sample (manufactured by Rigaku Corporation) before measurement. Measurement is performed under the conditions described below.

Detection spectrum: Cl-KA

X-ray excitation condition: target Pb, tube voltage 50 kV, tube current 4.00 mA

Dispersive crystal: PET

Detector: PC (proportional counter)

Scanning conditions: starting angle 62.0 deg, ending angle 69.0 deg, step 0.05 deg, time 0.2 sec, speed 15 deg/min., peak angle 65.44 deg The net intensity (kcps) of chlorine atoms (Cl) determined by measurement under the above conditions is taken as the X-ray intensity of the film surface.

Chlorine serves as a catalyst for the oxidative decomposition reaction of the resin as described above and has a function of promoting the oxidative decomposition reaction. Since the presence amount of chlorine required for promoting oxidative decomposition is changed also by the thickness of the film, it is necessary to divide the sum of chlorine atoms (Cl) detected by fluorescent X-ray analysis by the thickness of the film. When this value (chlorine amount=the sum of fluorescent X-ray intensities of chlorine/the thickness of the substrate film or the laminate) is higher than 0.015 kcps/μm, the presence amount of chlorine in the barrier film or the laminate is too large, so that oxidative decomposition progresses and coloring occurs, which makes recycling difficult. From the viewpoint of further enhancing recyclability, the chlorine amount is more preferably 0.012 kcps/μm or less. The chlorine amount can be adjusted, for example, by the thickness, composition, and production method, and the like of each of the substrate film 1, the sealant layer 6, and the gas barrier coating layer 4.

The barrier film and the laminate of the present embodiment can be suitably used for various use applications such as a packaging product such a container or a bag, a sheet molded article such as a decorative sheet or a tray, an optical film, a resin plate, various label materials, a lid material, and a laminate tube, and particularly suitably used for a packaging product. Examples of the packaging product include a pillow bag, a standing pouch, a three-side sealed bag, and a four-side sealed bag. Furthermore, the barrier film and the laminate of the present embodiment can also be used for packaging products to be subjected to a boiling treatment, a retort treatment, and the like.

EXAMPLES

Hereinafter, the present disclosure will be specifically described with reference to Examples; however, the present disclosure is not limited to these Examples.

<Preparation of Coating Solution>

As the composition for forming a gas barrier coating layer used in Examples and Comparative Examples, the following coating solutions A to D were prepared.

(Coating Solution A)

A solution obtained by mixing (a), (b), and (c) solutions described below so that (a) solution/(b) solution/(c) solution was 70/20/10 (mass ratio of solid content).

(a) solution: hydrolyzed solution with a solid content of 5% by mass (in terms of $SiO_2$) obtained by adding 72.1 g of 0.1 N hydrochloric acid to 17.9 g of tetraethoxysilane and 10 g of methanol, stirring the mixture for 30 minutes, and hydrolyzing the mixture (b) solution: water/methanol (mass ratio of water:methanol:95:5) solution containing 5% by mass of polyvinyl alcohol (c) solution: hydrolyzed solution obtained by diluting 1,3,5-tris(3-trialkoxysilylpropyl) isocyanurate with a mixed solution of water/isopropyl alcohol (mass ratio of water:isopropyl alcohol:1:1) at a solid content of 5% by mass (Coating Solution B)

A solution obtained by mixing an aqueous dispersion of a polyurethane resin (aqueous polyurethane dispersion, trade name "TAKELAC (registered trademark) WPB-341", manufactured by Mitsui Chemicals, Inc., solid content concentration: 30% by mass), 5% by mass of a polyvinyl alcohol aqueous solution, and 3-glycidoxypropyltrimethoxysilane at a mass ratio of solid content of 75:20:5.

(Coating Solution C)

A solution obtained by mixing (d) and (e) solutions described below so that (d) solution/(e) solution was 45/55 (mass ratio of solid content).

(d) solution: solution obtained by blending polyvinyl alcohol and montmorillonite at a mass ratio of 15/1 and diluting the blended product with a mixed solution of water/isopropyl alcohol=95/5 (mass ratio) at a solid content of 6.5% by mass (e) solution: hydrolyzed solution obtained by blending tetraethoxysilane and 3-glycidoxypropyltrimethoxysilane at a mass ratio of 10 (in terms of $SiO_2$)/1, adding 0.3 N hydrochloric acid for hydrolysis, and diluting the resultant product with a mixed solution of water/methanol=1/1 (mass ratio) at a solid content of 110% by mass (Coating Solution D)

A polyvinylidene chloride resin-based solution (solid content: 5% by mass) obtained by dissolving a polyvinylidene chloride-based resin (manufactured by Asahi Kasei Corp., trade name "SARAN RESIN F216") in a mixed organic solvent of toluene and methyl ethyl ketone (mass ratio: toluene/methyl ethyl ketone=1/2).

Examples 1 and 2 and Comparative Examples 1 to 4

Production of Barrier Film

A stretched polypropylene film having a thickness of 20 μm was prepared as a substrate film. An anchor coat layer having a thickness of 0.1 μm was formed on one surface of the substrate film by adding tolylene diisocyanate to acrylic polyol so that the NCO group is equivalent to the OH group of the acrylic polyol, diluting the mixture with ethyl acetate to have a total solid content of 5% by mass, and applying and drying a solution obtained by adding and mixing 5% by mass of β-(3,4-epoxycyclohexyl) trimethoxysilane to the total solid content by gravure coating. Next, a vapor deposition layer was formed on the anchor coat layer by vapor-depositing a thin film of silicon oxide having a thickness of 30 nm by reactive vapor deposition using high-frequency excitation ion plating in an oxygen atmosphere under reduced pressure. Furthermore, the gas barrier coating layer was formed on the vapor deposition layer. The gas barrier coating layer was formed by applying any solution of the coating solutions A to D by a gravure coating method and drying the solution under the conditions of 80° C. for 20 seconds. The type of the coating solution and the thickness of the gas barrier coating layer are shown in Table 1.

Example 3

Production of Laminate

An unstretched polypropylene film having a thickness of 60 μm as a sealant layer was pasted on the surface of the barrier film produced in Example 1 on the gas barrier coating layer side with a two-liquid curable urethane-based adhesive interposed therebetween by a dry lamination method, thereby producing a laminate.

Example 4

Production of Laminate

A laminate was produced in the same manner as in Example 3, except that the barrier film produced in Comparative Example 1 was used.

Comparative Example 5

Production of Laminate

A laminate was produced in the same manner as in Example 3, except that the barrier film produced in Comparative Example 4 was used.

(Measurement of Chlorine Amount)

The chlorine amount of each of the barrier films and the laminates obtained in Examples and Comparative Examples was measured by using a fluorescent X-ray analyzer (manufactured by Rigaku Corporation, wavelength dispersive fluorescent X-ray analyzer Supermini). It was checked that the resolution of a PC detector is 45% or less by using a PHA-adjusted sample (manufactured by Rigaku Corporation) before measurement. Measurement was performed under the conditions described below. The net intensity (kcps) of chlorine atoms (Cl) determined by measurement under the following conditions was taken as the X-ray intensity of the film surface.

Detection spectrum: Cl-KA

X-ray excitation condition: target Pb, tube voltage 50 kV, tube current 4.00 mA

Dispersive crystal: PET

Detector: PC (proportional counter)

Scanning conditions: starting angle 62.0 deg, ending angle 69.0 deg, step 0.05 deg, time 0.2 sec, speed 15 deg/min., peak angle 65.44 deg The fluorescent X-ray intensities (kcps) of chlorine atoms detected from the both surfaces of the barrier film was measured and the sum of fluorescent X-ray intensities of chlorine atoms of both surfaces was determined. A value obtained by dividing the determined sum of fluorescent X-ray intensities of chlorine atoms by the thickness of the barrier film was taken as the chlorine amount (kcps/μm). For the laminate, the substrate film and the sealant layer were peeled off from the laminate, the fluorescent X-ray intensities (kcps) of chlorine atoms detected from both surfaces of each resin film was measured, and the sum of fluorescent X-ray intensities of chlorine atoms of all the surfaces was determined. A value obtained by dividing the determined sum of fluorescent X-ray intensities of chlorine atoms by the thickness of the laminate was taken as the chlorine amount (kcps/μm). Results are shown in Table 1 and Table 2.

(Evaluation of Coloring of Molten Product and Melt Mass Flow Rate)

The barrier film and the laminate obtained in each of Examples and Comparative Examples were cut into appropriate sizes and melt-extruded by using a melt viscosity measuring apparatus (manufactured by Toyo Seiki Seisaku-sho, Ltd., trade name "Melt Indexer F-F01") according to the method described in JIS K7210 under the conditions of a temperature of 230° C. and 2.16 kgf. The appearance of the extruded molten resin was visually observed, and presence or absence of coloring and recyclability were evaluated as follows.

A: Coloring is not confirmed, and recyclability is excellent.

B: Coloring is confirmed, and recyclability is poor.

C: Coloring is severe, and recycling is not possible.

Furthermore, the melt mass flow rate (MFR, unit: g/10 min.) of the molten resin when being melt-extruded under the above conditions was measured. Measurement for the MFR was performed 5 times and an average value thereof was used. In a case where the MFR is a value of 6.0 g/min. or more, the oxidative decomposition of the polypropylene has already started, so that recycling suitability is poor. The presence or absence of coloring and evaluation results of MFR are shown in Table 1 and Table 2.

(Measurement of Oxygen Transmission Rate)

The oxygen transmission rate of each of the barrier film and the laminate was measured. Measurement was performed by using an oxygen transmission rate measuring apparatus (manufactured by Modern Controls, Inc., trade name "OXTRAN 2/20") under the conditions of a temperature of 30° C. and a relative humidity of 70%. The measurement method conformed to JIS K7126-2 (isopiestic method) and ASTM D3985-81, and the measured value was expressed in unit [$cm^3$ (STP)/$m^2$·day·MPa]. Results are shown in Table 1 and Table 2.

TABLE 1

| | Coating solution | Thickness of gas barrier coating layer (μm) | Chlorine amount (kcps/μm) | Coloring evaluation | MFR (g/10 min.) | Oxygen transmission rate ($cm^3$/$m^2$ · day · MPa) |
|---|---|---|---|---|---|---|
| Example 1 | A | 0.3 | 0.012 | A | 4.5 | 0.5 |
| Example 2 | B | 0.4 | 0.011 | A | 2.1 | 0.3 |
| Comparative Example 1 | C | 0.5 | 0.036 | B | 7.8 | 0.3 |
| Comparative Example 2 | C | 0.3 | 0.026 | B | 6.9 | 0.5 |
| Comparative Example 3 | A | 0.6 | 0.016 | B | 6.3 | 0.2 |
| Comparative Example 4 | D | 1.0 | 9.4 | C | 11 | 8 |

TABLE 2

| | Coating solution | Thickness of gas barrier coating layer (μm) | Chlorine amount (kcps/μm) | Coloring evaluation | MFR (g/10 min.) | Oxygen transmission rate ($cm^3$/$m^2$ · day · MPa) |
|---|---|---|---|---|---|---|
| Example 3 | A | 0.3 | 0.005 | A | 3.3 | 0.2 |
| Example 4 | C | 0.5 | 0.010 | A | 4.2 | 0.2 |
| Comparative Example 5 | D | 1.0 | 2.3 | B | 7.5 | 7 |

INDUSTRIAL APPLICABILITY

By using the barrier film or the laminate of the present disclosure, recyclability can be improved and a mono-material packaging material suitable for material recycling can be produced, so that helping to solve environmental problems and waste problems can be expected.

REFERENCE SIGNS LIST

1: substrate film, 2: anchor coat layer, 3: vapor deposition layer, 4: gas barrier coating layer, 5: adhesive layer, 6: sealant layer, 10: gas barrier layer, 100: barrier film, 200: laminate.

The invention claimed is:

1. A barrier film comprising: a substrate film containing a polyolefin; and a gas barrier layer formed on at least one surface of the substrate film, wherein the gas barrier layer comprises a gas barrier coating layer, the gas barrier coating layer is formed from a composition comprising hydrolyzed tetraethoxysilane, polyvinyl alcohol and hydrolyzed 1,3,5-tris(3-trialkoxysilylpropyl) isocyanurate in a mass ratio of solid content in a range of 60-80:15-25:5-15, and when both surfaces of the barrier film are analyzed with a fluorescent X-ray analyzer, a value obtained by dividing a sum of fluorescent X-ray intensities of chlorine detected from the both surfaces by a thickness of the substrate film (the sum of fluorescent X-ray intensities of chlorine/the thickness of the substrate film) is 0.015 kcps/μm or less.

2. The barrier film according to claim 1, wherein the gas barrier layer further comprises a vapor deposition layer containing an inorganic oxide.

3. The barrier film according to claim 2, wherein the inorganic oxide comprises aluminum oxide, silicon oxide, or a mixture thereof.

4. The barrier film according to claim 2, wherein the vapor deposition layer has a thickness of 10 to 150 nm.

5. The barrier film according to claim 1, further comprising an anchor coat layer between the substrate film and the gas barrier layer, wherein the anchor coat layer comprises an acrylic urethane-based resin.

6. The barrier film according to claim 1, wherein the polyolefin is a polypropylene.

7. The barrier film according to claim 1, wherein the substrate film has a thickness of 12 to 38 μm, and the gas barrier coating layer has a thickness of 0.3 to 0.5 μm.

8. The barrier film according to claim 5, wherein the anchor coat layer has a thickness of 0.05 to 2 μm.

9. The barrier film according to claim 1, wherein the substrate film is a biaxially oriented polypropylene film.

10. A laminate comprising a sealant layer containing a polyolefin and the barrier film according to claim 1.

11. The laminate according to claim 10, wherein the sealant layer has a thickness of 20 to 100 μm.

12. The laminate according to claim 10, further comprising an adhesive layer comprising a two-liquid curable urethane-based adhesive.

13. The laminate according to claim 10, wherein the substrate film has a thickness of 12 to 38 μm and the sealant layer has a thickness of 20 to 100 μm.

14. The laminate according to claim 10, wherein the substrate film is a biaxially oriented polypropylene film having a thickness of 12 to 38 μm, the gas barrier coating layer has a thickness of 0.3 to 0.5 μm, the sealant layer has a thickness of 20 to 100 μm, and the value obtained by the fluorescent X-ray analyzer is 0.012 kcps/μm or less.

15. The barrier film according to claim 1, wherein the substrate film is a biaxially oriented polypropylene film having a thickness of 12 to 38 μm, and the value obtained by the fluorescent X-ray analyzer is 0.012 kcps/μm or less.

* * * * *